Nov. 27, 1923. 1,475,538

C. E. BRADBURN ET AL

BRAKE

Filed Oct. 21, 1922 2 Sheets-Sheet 1

C. E. Bradburn and
A. Finke,
Inventors

By C. A. Snow & Co.
Attorneys

Nov. 27, 1923.  
C. E. BRADBURN ET AL  
BRAKE  
Filed Oct. 21, 1922  
1,475,538  
2 Sheets-Sheet 2
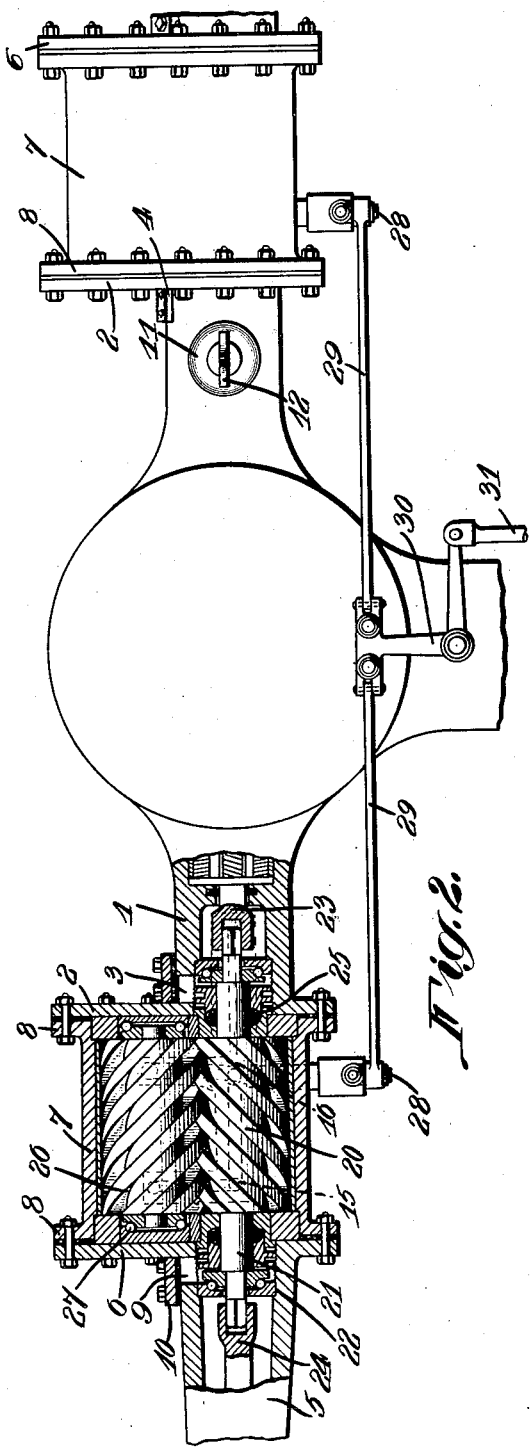
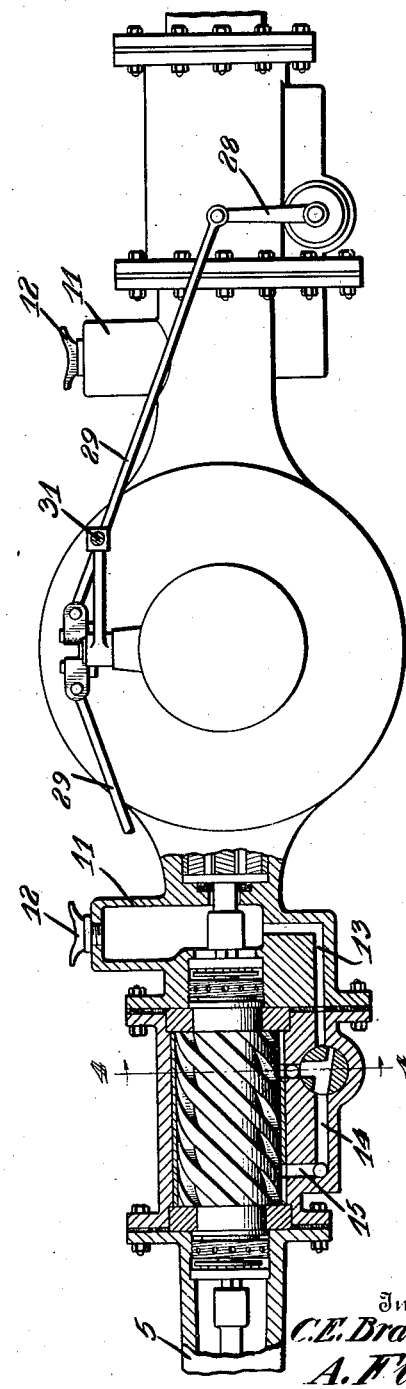
Inventors  
C. E. Bradburn &  
A. Finke,  
By C. A. Snow & Co.  
Attorneys Patented Nov. 27, 1923.

1,475,538

UNITED STATES PATENT OFFICE.

CURTIS E. BRADBURN AND AUGUST FINKE, OF GARDEN CITY, KANSAS; SAID BRADBURN ASSIGNOR OF HIS ENTIRE RIGHT TO WILLIAM WONN, OF GARDEN CITY, KANSAS.

BRAKE.

Application filed October 21, 1922. Serial No. 596,097.

*To all whom it may concern:*

Be it known that we, CURTIS E. BRADBURN and AUGUST FINKE, citizens of the United States, residing at Garden City, in the county of Finney, State of Kansas, have invented a new and useful Brake, of which the following is a specification.

This invention relates to a fluid brake designed primarily for use in connection with motor vehicles.

One of the objects of the invention is to provide cooperating worms operatively connected to the axle shaft so as to be rotated thereby, these worms constituting means for setting up a circulation of fluid.

Another object is to provide means under the control of the driver for regulating the circulation of the fluid, thus to retard or stop the movement of the vehicle as desired.

A further object is to provide a reservoir for trapping all fluid that might be expelled under pressure, means being employed whereby fluid within the reservoir can be added to the circulating body of fluid.

Another object is to provide a brake of this character which is simple and compact in construction and can be combined with a vehicle axle without necessitating any material changes in design.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawing the preferred form of the invention has been shown.

In said drawings

Figure 2 is an enlarged plan view of the rear axle one of the brake units being shown in section.

Figure 3 is a rear elevation of the structure shown in Figure 2, one of the brake units being in section.

Figure 1:
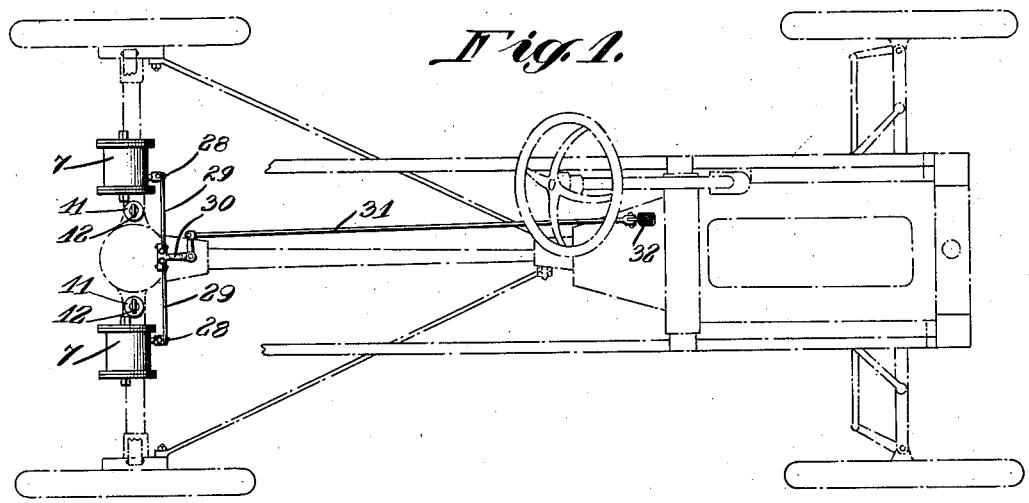
Figure 1 is a plan view of the brake apparatus, portions of the vehicle to which it is applied being indicated by broken lines.
Figures 7, 8:
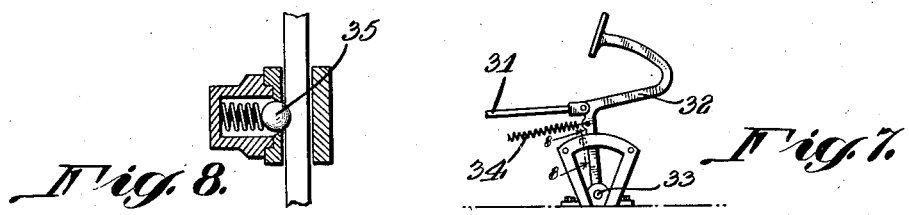
Figure 7 is a side elevation of the control pedal.
Figure 8 is an enlarged section on line 8—8 Figure 7.

Referring to the figures by characters of reference 1 designates the central section of the housing of the rear axle and differential. The ends of this section are formed with flanges 2 and openings 3 are provided in section 1 close to the flanges, these openings being normally closed by cover plates 4. The end sections of the axle housing have been indicated at 5 and are provided, at their inner ends, with flanges 6 corresponding with the flanges 2. Interposed between each flange 6 and the adjoining flange 2 is an elliptical housing 7 having flanges 8 bolted or otherwise secured to the flanges 6 and 2. Openings 9 are provided in the sections 5 close to the flanges 6 and are normally closed by cover plates 10.

Extending upwardly from the central section 1 near the flanges 2 are reservoirs or containers 11 preferably closed by screw plugs 12. Each reservoir has a passage 13 extending from the bottom thereof and opening into a by-pass 14 formed in the bottom wall of the housing 7 and opening into the end portions of the housing through ports 15 and 16. Each of the ports 16 is forked or provided with a branch, as shown at 17 so as to open into the housing 7 at opposite sides of the center thereof. Port 15 is similarly constructed, as will appear by referring to the dotted lines in Figure 2.

Figure 5:
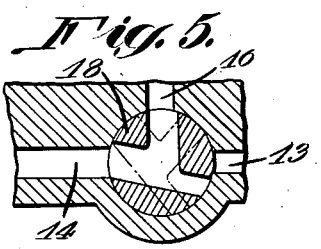
Figure 5 is a section on line 5—5 Figure 4, showing the valve in its normal position.
Figure 6:
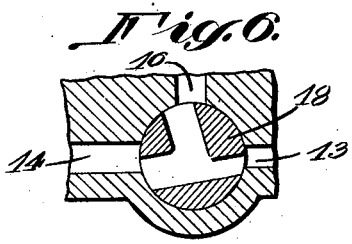
Figure 6 is a similar view showing the valve shifted to replenish the brake system from the reservoir.
Figure 4:
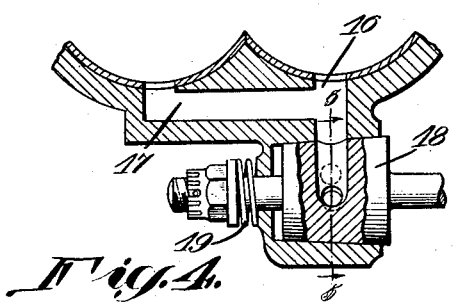
Figure 4 is a section on line 4—4 Figure 3.

Mounted within the by-pass 14 at its point of communication with the port 16 is a valve 18 having yielding means, indicated generally at 19, for holding it tight to its seat. The valve is a three-way valve normally in communication with by-pass 14 and port 16 so that fluid is thus free to flow from port 15 and its branch through by-pass 14 to port 16 and its branch. By turning the valve in one direction communication between by-pass 14 and port 16 can be cut off. See broken lines in Figure 5, the direction of rotation being indicated by an arrow. By turning the valve in the opposite direction from its normal position the passage 13, by-pass 14 and port 16 can all be brought into communication as shown in Figure 6.

Mounted within one side portion of the housing 7 is a worm 20 carrying a shaft section 21 journaled within bearings 22 provided in the ends of the sections 1 and 5 of the axle housing. Shaft section 21 is suitably coupled to the central shaft section 23 of the axle and to the end shaft section 24 of the axle. The bearings are suitably packed as indicated at 25. Another worm 26 is journaled in the other side portion of housing 7 and is provided with suitable bearings 27. The two worms fit snugly within the housing and mesh with each other and as their threads are pitched more than forty five degrees it will be obvious that rotation of the worm 20 will produce rotation of worm 26. The worms are so pitched that when they rotate by reason of their connection with the vehicle axle they will cooperate to force fluid contents of the housing 7 toward and into port 16 and its branch 17 and if the valve 18 is in its normal position the fluid thus propelled will flow through by-pass 14 and port 15 and its branch into the other or outer end of the housing 7. If the valve should be closed and the circulation of fluid stopped, the reservoir 11 would receive and hold any surplus fluid that might be pressed through the inner bearing and its packing 25 by the excessive pressure to which it would be subjected. Thereafter the supply of fluid in housing 7 could be replenished by bringing the valve to the position shown in Figure 6 so that fluid may gravitate from the reservoir into the housing 7 and the passages leading thereto.

It is to be understood of course that two of these brake units are provided on the axle, both of them being of the same construction although oppositely disposed. The two valves 18 have crank arms 28 connected by rods 29 to one arm of a bell crank 30. The other arm of the bell crank is connected by a rod 31 to a foot lever or pedal 32 fulcrumed at 33 where it can be readily actuated by the driver. A spring 34 serves to hold the lever normally in one position with the valve 18 positioned as shown in Figure 5. A spring pressed ball 35 constitutes a snap stop for holding the lever in normal position. By pulling the lever back past the stop the valve will be brought to the position shown in Figure 6. By pushing the lever forward the valve will be brought to the position shown by broken lines in Figure 5.

As before intimated the two housings 7 and the ports opening thereinto are to be filled with a fluid such as oil or the like. Thus by partly closing valve 18 during the actuation of the worms the flow of fluid will be retarded and the movement of the vehicle likewise retarded. By completely closing the valve the vehicle will be brought to a stop because the fluid cannot circulate and the worms cannot therefore rotate.

Having thus described the invention, what we claim as new is:

1. In a fluid brake the combination with an axle housing and an axle shaft therein, of a brake housing supported by the axle housing, oppositely pitched meshing worms within the brake housing, one of said worms being connected to and revoluble with the axle shaft and constituting means for rotating the other worm, a by-pass communicating with the ends of the brake housing, a fluid within the brake housing and by-pass, and means for controlling the flow of fluid through the by-pass.

2. The combination with an axle housing and a shaft journaled therein, of a brake housing carried by the axle housing, oppositely pitched meshing worms within the brake housing, one of said worms being revoluble with the shaft and constituting a drive for the other worm, a reservoir, a by-pass connecting the ends of the brake housing and communicating with the reservoir, and means for controlling the flow of fluid through the by-pass and from the reservoir.

3. The combination with an axle housing and a shaft journaled therein, of flanges on the housing, a brake housing secured to and between the flanges, oppositely pitched meshing worms in the brake housing, a connection between one of the worms and the shaft, a reservoir on the axle housing, a bearing for the connection located between the brake housing and the reservoir a by-pass connecting the ends of the brake housing, a passage connecting the reservoir with the by-pass, and a valve for controlling the flow of fluid between the passage and the by-pass and through the by-pass, said reservoir constituting means for receiving fluid leaking through the bearing.

4. The combination with a sectional axle housing, flanges on the sections, and a brake housing between and secured to the flanges, of oppositely pitched meshing worms within the brake housing, a sectional shaft in the housings, one of said worms being secured to one of the shaft sections and constituting a drive for the other worm, a by-pass connecting the ends of the brake housing, and means for controlling the flow of fluid through the by-pass.

5. The combination with a sectional axle housing, flanges on the sections, and a brake housing between and secured to the flanges, of oppositely pitched meshing worms within the brake housing, means for driving one of the worms to actuate the other worm, a by-pass connecting the ends of the brake housing, and means for controlling the flow of fluid through the by-pass.

6. The combination with a sectional axle housing, of a brake housing secured between said sections, oppositely pitched meshing worms within the brake housing, a shaft journaled within the axle housing for driving one of the worms, said worms cooperating to force a fluid toward one end of the brake housing, a reservoir for receiving fluid leaking under pressure from the brake housing and along the shaft, a by-pass connecting the ends of the brake housing, a passage connecting the by-pass to the reservoir, a valve, means for holding the valve normally in position to close the passage and maintain the by-pass open, and means shiftable to either of two positions for actuating the valve to close the by-pass and passage or to open the by-pass and passage.

In testimony that we claim the foregoing as our own, we have hereto affixed our signatures in the presence of two witnesses.

CURTIS E. BRADBURN.
AUGUST FINKE.

Witnesses:
F. G. KAUFFMAN,
WM. WORM.